(12) United States Patent
Colavolpe et al.

(10) Patent No.: US 7,359,582 B2
(45) Date of Patent: Apr. 15, 2008

(54) METHOD BASED ON STOKES PARAMETERS FOR THE ADAPTIVE ADJUSTMENT OF PMD COMPENSATORS IN OPTICAL FIBER COMMUNICATION SYSTEMS AND COMPENSATOR IN ACCORDANCE WITH SAID METHOD

(75) Inventors: Giulio Colavolpe, Parma (IT); Enrico Forestieri, Parma (IT)

(73) Assignee: Marconi Communications S.p.A., Genoa (IT)

( * ) Notice: Subject to any disclaimer, the term of this patent is extended or adjusted under 35 U.S.C. 154(b) by 0 days.

(21) Appl. No.: 10/498,613

(22) PCT Filed: Nov. 29, 2002

(86) PCT No.: PCT/IB02/05446

§ 371 (c)(1),
(2), (4) Date: Feb. 14, 2005

(87) PCT Pub. No.: WO03/050984

PCT Pub. Date: Jun. 19, 2003

(65) Prior Publication Data

US 2005/0141802 A1    Jun. 30, 2005

(30) Foreign Application Priority Data

Dec. 13, 2001    (IT) .......................... MI2001A2632

(51) Int. Cl.
*G02B 6/42* (2006.01)
*G02F 1/03* (2006.01)

(52) U.S. Cl. ........................................ 385/11; 359/249
(58) Field of Classification Search .................. 385/11; 359/249
See application file for complete search history.

(56) References Cited

U.S. PATENT DOCUMENTS 6,567,167 B1* 5/2003 Chou et al. .................. 356/367

2005/0220389 A1* 10/2005 Riposati et al. ............... 385/11

FOREIGN PATENT DOCUMENTS

EP     0 553 460 A2    12/1992
EP     1 170 890 A1    1/2002

OTHER PUBLICATIONS

*Simple Dynamic Polarisation Mode Dispersion Compensator*, Electronics Letters, IEE Stevenage, GB, C, Francia, et al., vol. 35, No. 5, Mar. 4, 1999, pp. 414-415.

(Continued)

*Primary Examiner*—Sung Pak
*Assistant Examiner*—Jerry T Rahll
(74) *Attorney, Agent, or Firm*—Kirschstein, et al.

(57) ABSTRACT

A method for the adaptive adjustment of a PMD compensator in optical fiber communication systems with the compensator comprising a cascade of adjustable optical devices through which passes an optical signal to be compensated and comprising the steps of computing the Stokes parameters $S_0$, $S_1$, $S_2$, $S_3$ in a number Q of different frequencies of the signal output from the compensator, producing control signals for parameters of at least some of said adjustable optical devices so as to make virtually constant said Stokes parameters computed at different frequencies. A compensator comprising a cascade of adjustable optical devices (12-14) through which passes an optical signal to be compensated, an adjustment system which takes the components $y_1(t)$ e $y_2(t)$ on the two orthogonal polarizations from the signal at the compensator output, and which comprises a controller (15, 16) which on the basis of said components computes the Stokes parameters $S_0$, $S_1$, $S_2$, $S_3$ in a number Q of different frequencies of the signal output by the compensator and which emits control signals for at least some of said adjustable optical devices so as to make virtually constant the Stokes parameters computed at the different frequencies.

16 Claims, 1 Drawing Sheet

OTHER PUBLICATIONS

*Automatic Polarisation Mode Dispersion Compensation in 40 GBIT/S Optical Transmission System*, Electronics Letters, IEE Stevenage, BG, D. Sandel, et al., vol. 34, No. 23, Nov. 12, 1998, pp. 2258-2259.

*Adaptive PMD Mitigation at 10 GBIT/S Using an Electronic Sige Equaliser IC*, 25th European Conference on Optical Communication, (ECOC'99) Nice, France, H. Buelow, et al., Sep. 27-30, 1999, Regular and Invited Papers, European Conference on Optical Communication (ECOC), Paris, FR, vol. II or II, Sep. 26, 1999, pp. II-138-II-139.

* cited by examiner

METHOD BASED ON STOKES PARAMETERS FOR THE ADAPTIVE ADJUSTMENT OF PMD COMPENSATORS IN OPTICAL FIBER COMMUNICATION SYSTEMS AND COMPENSATOR IN ACCORDANCE WITH SAID METHOD

The present invention relates to methods of adaptive adjustment of PMD compensators in optical fiber communication systems. The present invention also relates to a compensator in accordance with said method.

In optical fiber telecommunications equipment the need to compensate the effects of polarization mode dispersion (PMD) which occur when an optical signal travels in an optical fiber based connection is known.

It is known that PMD causes distortion and dispersion of optical signals sent over optical fiber connections making the signals distorted and dispersed. The different time delays among the various signal components in the various polarization states acquire increasing importance with the increase in transmission speeds. In modern optical fiber based transmission systems with ever higher frequencies (10 Gbit/s and more), accurate compensation of PMD effects becomes very important and delicate. This compensation must be dynamic and performed at adequate speed.

The general purpose of the present invention is to remedy the above mentioned shortcomings by making available a method of fast, accurate adaptive adjustment of a PMD compensator and a compensator in accordance with said method.

In view of this purpose it was sought to provide in accordance with the present invention a method for the adaptive adjustment of a PMD compensator in optical fiber communication systems with the compensator comprising a cascade of adjustable optical devices over which passes an optical signal to be compensated comprising the steps of computing the Stokes parameters S0, S1, S2, S3 in a number Q of different frequencies of the signal output from the compensator, producing control signals for parameters of at least some of said adjustable optical devices so as to make virtually constant said Stokes parameters computed at the different frequencies.

In accordance with the present invention it was also sought to realize a PMD compensator in optical fiber communication systems applying the method and comprising a cascade of adjustable optical devices over which passes an optical signal to be compensated and an adjustment system which takes the components $y_1(t)$ and $y_2(t)$ on the two orthogonal polarizations at the compensator output with the adjustment system comprising a controller which on the basis of said components taken computes the Stokes parameters $S_0$, $S_1$, $S_2$, $S_3$ in a number Q of different frequencies of the signal output from the compensator and which emits control signals for at least some of said adjustable optical devices so as to make virtually constant the Stokes parameters computed at the different frequencies.

To clarify the explanation of the innovative principles of the present invention and its advantages compared with the prior art there is described below with the aid of the annexed drawings a possible embodiment thereof by way of non-limiting example applying said principles. In the drawings—

Figure 1:
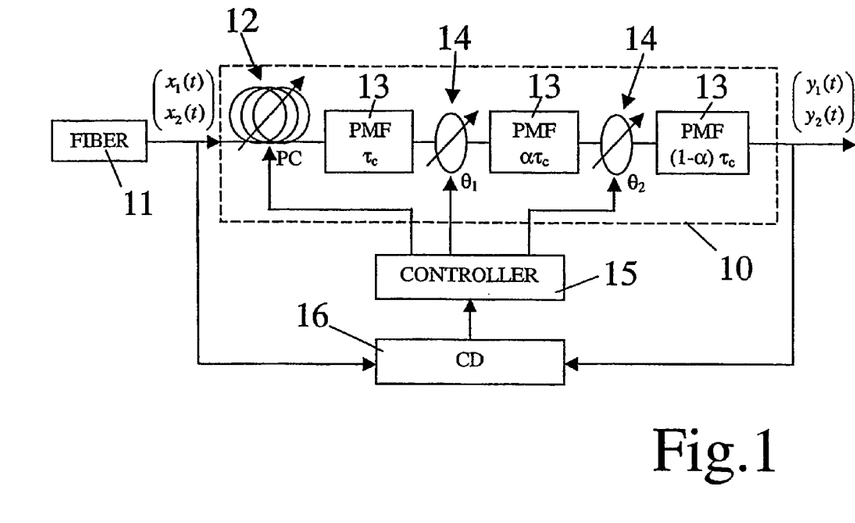
FIG. 1 shows a block diagram of a PMD compensator with associated control circuit.

With reference to the FIGS FIG. 1 shows the structure of a PMD compensator designated as a whole by reference number 10. This structure consists of the cascade of some optical devices which receive the signal from the transmission fiber 11. The first optical device is a polarization controller 12 (PC) which allows modification of the optical signal polarization at its input. There are three polarization maintaining fibers 13 (PMF) separated by two optical rotators 14.

A PMF fiber is a fiber which introduces a predetermined differential unit delay (DGD) between the components of the optical signal on the two principal states of polarization (PSP) termed slow PSP and fast PSP.

In the case of the compensator shown in FIG. 1 the DGD delays at the frequency of the optical carrier introduced by the three PMFs are respectively $\tau_c$, $\alpha\tau_c$ and $(1-\alpha)\tau_c$ with $0<\alpha<1$ and with $\tau_c$ and $\alpha$ which are design parameters.

An optical rotator is a device which can change the polarization of the optical signal upon its input by an angle $\theta_i$ (the figure shows $\theta_1$ for the first rotator and $\theta_2$ for the second) on a maximum circle on the Poincaré sphere.

An optical rotator is implemented in practice by means of a properly controlled PC.

In FIG. 1, $x_1(t)$ and $x_2(t)$ designate the components on the two PSPs of the optical signal at the compensator input whereas similarly $y_1(t)$ and $y_2(t)$ are the components of the optical signal at the compensator output.

The input-output behavior of each optical device is described here by means of the so called Jones transfer matrix $H(\omega)$ which is a 2×2 matrix characterized by frequency dependent components. Designating by $W_1(\omega)$ e $W_2(\omega)$ the Fourier transforms of the optical signal components at the device input the Fourier transforms $Z_1(\omega)$ e $Z_2(\omega)$ of the optical signal components at the device output are given by:

$$\begin{pmatrix} Z_1(\omega) \\ Z_2(\omega) \end{pmatrix} = H(\omega) \begin{pmatrix} W_1(\omega) \\ W_2(\omega) \end{pmatrix} \qquad (1)$$

Thus the Jones transfer matrix of the PC is:

$$\begin{pmatrix} h_1 & h_2 \\ -h_2^* & h_1^* \end{pmatrix} \qquad (2)$$

where $h_1$ e $h_2$ satisfy the condition $|h_1|^2+|h_2|^2=1$ and are frequency independent.

Denoting by $\phi_1$ and $\phi_2$ the PC control angles, $h_1$ and $h_2$ are expressed by:

$$h_1 = -\cos(\phi_2-\phi_1)+j\sin(\phi_2-\phi_1)\sin\phi_1 \qquad (3)$$

$$h_2 = -j\sin(\phi_2-\phi_1)\cos\phi_1$$

Clearly if the PC is controlled using other angles or voltages, different relationships will correlate these other parameters with $h_1$ and $h_2$. The straightforward changes in the algorithms for adaptive adjustment of the PMD compensator are discussed below.

Similarly, an optical rotator with rotation angle $\theta_i$ is characterized by the following Jones matrix:

$$\begin{pmatrix} \cos\theta_i & \sin\theta_i \\ -\sin\theta_i & \cos\theta_i \end{pmatrix} \qquad (4)$$

The Jones transfer matrix of a PMF with DGD $\tau_i$ may be expressed as $RDR^{-1}$ where D is defined as:

$$D \triangleq \begin{pmatrix} e^{j\omega\tau_i/2} & 0 \\ 0 & e^{-j\omega\tau_i/2} \end{pmatrix} \qquad (5)$$

and R is a unitary rotation matrix accounting for the PSPs' orientation. This matrix R may be taken as the identity matrix I without loss of generality when the PSPs of all the PMFs are aligned.

As shown in FIG. 1, to control the PMD compensator a controller 15 is needed to produce optical device control signals of the compensator computed on the basis of the quantities sent to it by a controller pilot 16 termed controller driver (CD).

The CD feeds the controller with the quantities needed to update the compensator optical device control parameters. As described below, these quantities will be extracted by the CD from the signals at the input and/or output of the compensator.

The controller will operate following the criterion described below and will use one of the two algorithms described below.

To illustrate the PMD compensator adaptive adjustment algorithms let us assume that the controller can directly control the parameters $\phi_1$, $\phi_2$, $\theta_1$ and $\theta_2$ which we consolidate in a vector $\theta$ defined as:

$$\theta \triangleq (\phi_1, \phi_2, \theta_1, \theta_2)^T$$

If it is not so, in general there will be other parameters to control, for example some voltages, which will be linked to the previous ones in known relationships.

The time instants in which the update of the compensator parameters is realized are designated $t_n$ (con n=0, 1, 2 . . . , ), and $T_u$ designates the time interval between two successive updates, thus $t_{n+1}=t_n+T_u$. In addition, $\theta(t_n)$ designates the value of the compensator parameters after the nth update.

In accordance with the method of the present invention the criterion for adjusting the compensator parameters employs the so-called Stokes parameters. Computation of the Stokes parameters for an optical signal is well known to those skilled in the art and is not further described.

Again in accordance with the method the parameters $\theta$ of the compensator are adjusted to make constant the Stokes parameters computed at different frequencies on the compensator output signal. The four Stokes parameters $S_0$, $S_1$, $S_2$ e $S_3$ computed at the frequency $f_l$ are designated by:

$$S_0|_{f=f_l} \triangleq S_{0,l}$$

$$S_1|_{f=f_l} \triangleq S_{1,l}$$

$$S_2|_{f=f_l} \triangleq S_{2,l}$$

$$S_3|_{f=f_l} \triangleq S_{3,l}$$

Similarly, the Stokes parameters computed at the frequency $f_p$ are designated by $S_{0,p}$, $S_{1,p}$, $S_{2,p}$ e $S_{3,p}$.

Using these Stokes parameters the following unitary vectors are constructed with components given by the three Stokes parameters $S_1$, $S_2$, $S_3$ normalized at the parameter $S_0$. $(.)^T$ below designates the transpose while $(.)^*$ designates the complex conjugate:

$$\left(\frac{S_{1,l}}{S_{0,l}}, \frac{S_{2,l}}{S_{0,l}}, \frac{S_{3,l}}{S_{0,l}},\right)^T \text{ and } \left(\frac{S_{1,p}}{S_{0,p}}, \frac{S_{2,p}}{S_{0,p}}, \frac{S_{3,p}}{S_{0,p}},\right)^T$$

In the absence of PMD these two vectors are parallel. Consequently, if their quadratic Euclidean distance is considered $G_{l,p}(\theta)$:

$$G_{lp}(\theta) = \left(\frac{S_{1,l}}{S_{0,l}} - \frac{S_{1,p}}{S_{0,p}}\right)^2 + \left(\frac{S_{2,l}}{S_{0,l}} - \frac{S_{2,p}}{S_{0,p}}\right)^2 + \left(\frac{S_{3,l}}{S_{0,l}} - \frac{S_{3,p}}{S_{0,p}}\right)^2 \qquad (6)$$

which is a function of the parameters $\theta$ of the PMD compensator it will be zero when the PMD is compensated at the two frequencies considered $f_l$ and $f_p$.

Now consider a number Q of frequencies $f_l$, l=1, 2, . . . , Q. Compute the Stokes parameters at these frequencies and construct the corresponding units defined as explained above, i.e. with components given by the three Stokes parameters $S_1$, $S_2$, $S_3$ normalized with respect to the parameter $S_0$. All these units are parallel if and only if the sum of their quadratic Euclidean distances is zero.

Consequently, to adaptively adjust the PMD compensator parameters we define the function $G(\theta)$ which is to be minimized as the sum of the quadratic distances $G_{l,p}(\theta)$ with l,p=1, 2, . . . , Q, i.e. the sum of the quadratic distances of the pair of vectors at the different frequencies $f_l$ and $f_p$, for l,p=1, 2, . . . Q:

$$G(\theta) \triangleq \sum_{l=2}^{Q} \sum_{p=1}^{l-1} G_{lp}(\theta) \qquad (7)$$

The update rule for the compensator parameters to be used in accordance with the present invention are:

$$\phi_1(t_{n+1}) = \phi_1(t_n) - \gamma \frac{\partial G(\theta)}{\partial \phi_1}\bigg|_{\theta=\theta(t_n)} \qquad (8)$$

$$= \phi_1(t_n) - \gamma \sum_{l=2}^{Q} \sum_{p=1}^{l-1} \frac{\partial G_{lp}(\theta)}{\partial \phi_1}\bigg|_{\theta=\theta(t_n)}$$

$$\phi_2(t_{n+1}) = \phi_2(t_n) - \gamma \frac{\partial G(\theta)}{\partial \phi_2}\bigg|_{\theta=\theta(t_n)}$$

$$= \phi_2(t_n) - \gamma \sum_{l=2}^{Q} \sum_{p=1}^{l-1} \frac{\partial G_{lp}(\theta)}{\partial \phi_2}\bigg|_{\theta=\theta(t_n)}$$

$$\theta_1(t_{n+1}) = \theta_1(t_n) - \gamma \frac{\partial G(\theta)}{\partial \theta_1}\bigg|_{\theta=\theta(t_n)}$$

$$= \phi_1(t_n) - \gamma \sum_{l=2}^{Q} \sum_{p=1}^{l-1} \frac{\partial G_{lp}(\theta)}{\partial \theta_1}\bigg|_{\theta=\theta(t_n)}$$

$$\theta_2(t_{n+1}) = \theta_2(t_n) - \gamma \frac{\partial G(\theta)}{\partial \theta_2}\bigg|_{\theta=\theta(t_n)}$$

$$= \theta_2(t_n) - \gamma \sum_{l=2}^{Q} \sum_{p=1}^{l-1} \frac{\partial G_{lp}(\theta)}{\partial \theta_2}\bigg|_{\theta=\theta(t_n)}$$

where $\gamma>0$ is a scale factor which controls the amount of the adjustment.

In vector notation this means that the vector of the compensator parameters is updated by adding a new vector with its norm proportionate to the norm of the gradient of $G(\theta)$ and with opposite direction, i.e. with all its components having their sign changed. This way, we are sure to move towards a relative minimum of the function $G(\theta)$.

All this is equivalent to:

$$\theta(t_{n+1}) = \theta(t_n) - \gamma \nabla G(\theta)|_{\theta=\theta(t_n)} \qquad (9)$$
$$= \theta(t_n) - \gamma \sum_{l=2}^{Q} \sum_{p=1}^{l-1} \nabla G_{lp}(\theta) \Big|_{\theta=\theta(t_n)}$$

A simplified version of (9) consists of an update by means of a constant norm vector and therefore an update which uses only the information on the direction of $\nabla G(\theta)$. In this case the update rule becomes.

$$\theta(t_{n+1}) = \theta(t_n) - \gamma \text{sign} \nabla G(\theta)|_{\theta=\theta(t_n)} \qquad (10)$$
$$= \theta(t_n) - \gamma \text{sign} \sum_{l=2}^{Q} \sum_{p=1}^{l-1} \nabla G_{lp}(\theta) \Big|_{\theta=\theta(t_n)}$$

where sign (z) designates a vector with unitary components and of the same sign as the components or the vector z.

Two methods are now described for computing the gradient of the $G(\theta)$ function and obtaining the required control parameters.

First Method

To implement the update rules (8) the partial derivatives of $G(\theta)$ for $\theta=\theta(t_n)$ can be computed using the following five-step procedure.

Step 1. find the value of $G[\theta(t_n)]=G[\phi_1(t_n), \phi_2(t_n), \theta_1(t_n), \theta_2(t_n)]$ at iteration n. To do this, in the time interval $(t_n, t_n+T_u/5)$ the Stokes parameters at the above mentioned Q frequencies are derived and the value of the function $G(\theta)$ is computed using equations (6) and (7).

Step 2. find the partial derivative $$\frac{\partial G(\theta)}{\partial \phi_1}\Big|_{\theta=\theta(t_n)}$$

at iteration n. To do this, parameter $\phi_1$ is set at $\phi_1(t_n)+\Delta$ while the other parameters are left unchanged. The corresponding value of $G(\theta)$, i.e. $G[\phi_1(t_n)+\Delta, \phi_2(t_n), \theta_1(t_n), \theta_2(t_n)]$, is computed as in step 1 but in the time interval $(t_n+T_u/5, t_n+2T_u/5)$. The estimate of the partial derivative of $G(\theta)$ as a function of $\phi_1$ is computed as:

$$\frac{\partial G(\theta)}{\partial \phi_1}\Big|_{\theta=\theta(t_n)} \cong \frac{G[\phi_1(t_n)+\Delta, \phi_2(t_n), \theta_1(t_n), \theta_2(t_n)] - G[\phi_1(t_n), \phi_2(t_n), \theta_1(t_n), \theta_2(t_n)]}{\Delta} \qquad (11)$$

Step 3. Find the partial derivative:

$$\frac{\partial G(\theta)}{\partial \phi_2}\Big|_{\theta=\theta(t_n)}$$

at iteration n. To do this the parameter $\phi_2$ is set at $\phi_2(t_n)+\Delta$ while the other parameters are left changed. The corresponding value of $G(\theta)$, i.e. $G[\phi_1(t_n), \phi_2(t_n)+\Delta, \theta_1(t_n), \theta_2(t_n), )]$, is computed as in step 1 but in the time interval $(t_n 2T_u/5, t_n+3T_u/5)$. The estimate of the partial derivative of $G(\theta)$ with respect to $\phi_2$ is computed as:

$$\frac{\partial G(\theta)}{\partial \phi_2}\Big|_{\theta=\theta(t_n)} \cong \frac{G[\phi_1(t_n), \phi_2(t_n)+\Delta, \theta_1(t_n), \theta_2(t_n)] - G[\phi_1(t_n), \phi_2(t_n), \theta_1(t_n), \theta_2(t_n)]}{\Delta} \qquad (12)$$

Step 4: Find the partial derivative:

$$\frac{\partial G(\theta)}{\partial \theta_1}\Big|_{\theta=\theta(t_n)}$$

at iteration n. To do this, parameter $\theta_1$ is set at $\theta_1(t_n)+\Delta$ while the other parameters are left unchanged, the corresponding value of $G(\theta)$, i.e. $G[\phi_1(t_n), \phi_2(t_n), \theta_1(t_n)+\Delta, \theta_2(t_n)]$, is computed as in Step 1 but in the time interval $(t_n+3T_u/5, t_n+4T_u/5)$ and the estimate of the partial derivative of $G(\theta)$ with respect to $\theta_1$ is computed as:

$$\frac{\partial G(\theta)}{\partial \theta_1}\Big|_{\theta=\theta(t_n)} \cong \frac{G[\phi_1(t_n), \phi_2(t_n), \theta_1(t_n)+\Delta, \theta_2(t_n)] - G[\phi_1(t_n), \phi_2(t_n), \theta_1(t_n), \theta_2(t_n)]}{\Delta} \qquad (13)$$

Step 5: Find the partial derivative:

$$\frac{\partial G(\theta)}{\partial \theta_2}\Big|_{\theta=\theta(t_n)}$$

at iteration n. To do this the parameter $\phi_2$ is set at $\phi_2(t_n)+\Delta$ while the other parameters are left changed. The corresponding value of $G(\theta)$, i.e. $G[\phi_1(t_n), \phi_2(t_n), \theta_1(t_n), \theta_2(t_n)+\Delta]$, is computed as in step 1 but in the time interval $(t_n+4T_u/5, t_n+T_u)$. The estimate of the partial derivative of $G(\theta)$ with respect to $\phi_2$ is computed as:

$$\frac{\partial G(\theta)}{\partial \theta_2}\Big|_{\theta=\theta(t_n)} \cong \frac{G[\phi_1(t_n), \phi_2(t_n), \theta_1(t_n), \theta_2(t_n)+\Delta] - G[\phi_1(t_n), \phi_2(t_n), \theta_1(t_n), \theta_2(t_n)]}{\Delta} \qquad (14)$$

The above parameter update is done only after estimation of the gradient has been completed.

Note that in this case it is not necessary that the relationship between the control parameters of PC and optical rotators and the corresponding Jones matrices be known.

Indeed, the partial derivatives of the function with respect to the compensator control parameters are computed without knowledge of this relationship. Consequently if the control parameters are different from those assumed as an example and are for example some voltage or some other angle, we may similarly compute the partial derivative and update these different control parameters accordingly.

Lastly, it is noted that when this algorithm is used the CD must receive only the optical signal at the compensator output and must supply the controller with the Stokes parameters computed at the Q frequencies $f_l$, $l=1, 2, \ldots, Q$.

Second Method

When an accurate characterization of the PC and of each optical rotator is available the update rules can be expressed as a function of the signals on the two orthogonal polarizations at the compensator input and output.

In this case, for the sake of convenience it is best to avoid normalization of the three Stokes parameters $S_1$, $S_2$ e $S_3$ with respect to $S_0$ and use the function $H(\theta)$ defined as:

$$H(\theta) = \sum_{l=2}^{Q} \sum_{p=1}^{l-1} H_{lp}(\theta) \tag{15}$$

where $$H_{lp}(\theta) = (S_{1,l} - S_{1,p})^2 + (S_{2,l} - S_{2,p})^2 + (S_{3,l} - S_{3,p})^2 \tag{16}$$

Consequently we have new update rules similar to those expressed by equation (8) or equivalently (9) with the only change being that the new function $H(\theta)$ must substitute the previous $G(\theta)$.

Before describing how the gradient of this new function $H(\theta)$ is to be computed let us introduce for convenient an equivalent model of the PMD compensator.

Figure 2:
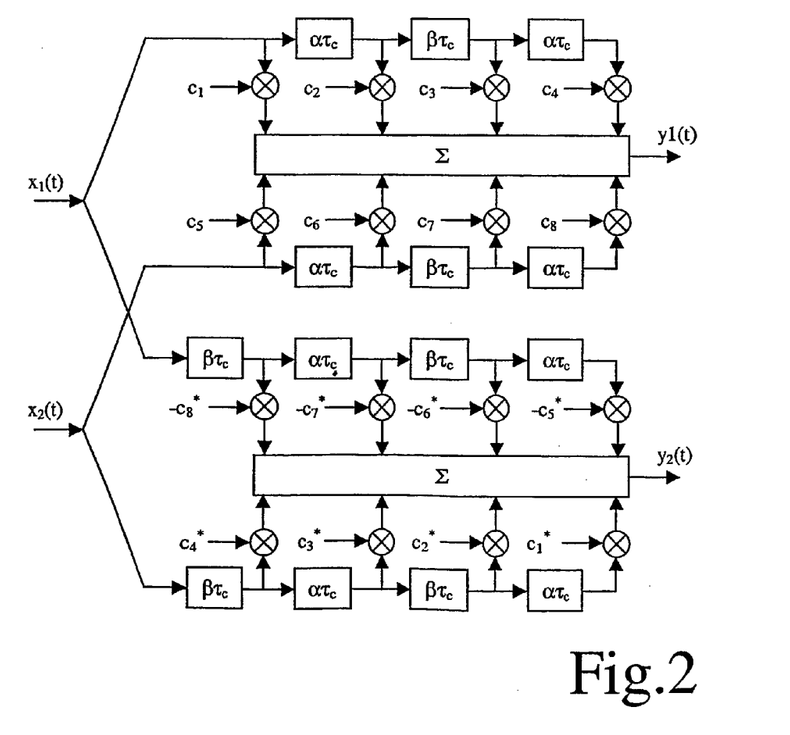
FIG. 2 shows an equivalent model of the PMD compensator.

Indeed it was found that the PMD compensator shown in FIG. 1 is equivalent to a two-dimensional transversal filter with four tapped delay lines (TDL) combining the signals on the two principal polarization states (PSP). This equivalent model is shown in FIG. 2 where:

$c_1 \hat{=} \cos\theta_1 \cos\theta_2 h_1$ $c_2 \hat{=} -\sin\theta_1 \sin\theta_2 h_1$ $c_3 \hat{=} -\sin\theta_1 \cos\theta_2 h_2^*$ $c_4 \hat{=} -\cos\theta_1 \sin\theta_2 h_2^*$ $c_5 \hat{=} \cos\theta_1 \cos\theta_2 h_2$ $c_6 \hat{=} -\sin\theta_1 \sin\theta_2 h_2$ $c_7 \hat{=} \sin\theta_1 \cos\theta_2 h_1^*$ $c_8 \hat{=} \cos\theta_1 \sin\theta_2 h_1^*$ (18)

For the sake of convenience let $c(\theta)$ designate the vector whose components are the $c_i$ in (17). It is noted that the tap coefficients $c_i$ of the four TDLs are not independent of each other. On the contrary, given four of them the others are completely determined by (17). In the FIG for the sake of clarity it is designated $\beta = 1-\alpha$.

The gradient of $H_{lp}(\theta)$ with respect to $\theta$ is to be computed as follows:

$$\nabla H_{lp}(\theta) = 4(S_{1,l} - S_{1,p}) \text{Re}\left\{\frac{1}{T_u}\int_{t_n}^{t_{n+1}} [y_{1,l}^*(t)a_l^T(t) - y_{2,l}(t)b_l^T(t) - y_{1,p}^*(t)a_p^T(t) + y_{2,p}^*(t)b_p^T(t)]dtJ\right\} +$$

$$4(S_{2,l} - S_{2,p}) \text{Re}\left\{\frac{1}{T_u}\int_{t_n}^{t_{n+1}} [y_{2,l}^*(t)a_l^T(t) + y_{1,l}(t)b_l^T(t) - y_{2,p}^*(t)a_p^T(t) - y_{1,p}^*(t)b_p^T(t)]dtJ\right\} -$$

$$4(S_{3,l} - S_{3,p}) \text{Im}\left\{\frac{1}{T_u}\int_{t_n}^{t_{n+1}} [y_{2,l}^*(t)a_l^T(t) + y_{1,l}(t)b_l^T(t) - y_{2,p}^*(t)a_p^T(t) - y_{1,p}^*(t)b_p^T(t)]dtJ\right\}$$

where:
$y_{1,l}(t)$ and $y_{2,l}(t)$ are the signals $y_1(t)$ and $y_2(t)$ at the compensator output respectively filtered through a narrow band filter centered on the frequency $f_l$ (similarly for $y_{1,p}(t)$ and $y_{2,p}(t)$);
$a_l(t)$ and $b_l(t)$ are the vectors:

$$a_l(t) = \begin{pmatrix} x_{1,l}(t) \\ x_{1,l}(t-\alpha\tau_c) \\ x_{1,l}(t-\tau_c) \\ x_{1,l}(t-\tau_c-\alpha\tau_c) \\ x_{2,l}(t) \\ x_{2,l}(t-\alpha\tau_c) \\ x_{2,l}(t-\tau_c) \\ x_{2,l}(t-\tau_c-\alpha\tau_c) \end{pmatrix} \quad b_l(t) = \begin{pmatrix} x_{2,l}^*(t-2\tau_c) \\ x_{2,l}^*(t-\tau_c-\beta\tau_c) \\ x_{2,l}^*(t-\tau_c) \\ x_{2,l}^*(t-\beta\tau_c) \\ -x_{1,l}^*(t-2\tau_c) \\ -x_{1,l}^*(t-\tau_c-\beta\tau_c) \\ -x_{1,l}^*(t-\tau_c) \\ -x_{1,l}^*(t-\beta\tau_c) \end{pmatrix}$$

with $x_{1,l}(t)$ and $x_{2,l}(t)$ which are respectively the signals $x_1(t)$ and $x_2(t)$ at the compensator input filtered by a narrow band filter centered on the frequency $f_l$ (similarly for $y_{1,p}(t)$ and $y_{2,p}(t)$);
J is the Jacobean matrix of the transformation $c=c(\theta)$ defined as $$J \triangleq \begin{pmatrix} \frac{\partial c_1}{\partial \phi_1} & \frac{\partial c_1}{\partial \phi_2} & \frac{\partial c_1}{\partial \theta_1} & \frac{\partial c_1}{\partial \theta_2} \\ \frac{\partial c_2}{\partial \phi_1} & \frac{\partial c_2}{\partial \phi_2} & \frac{\partial c_2}{\partial \theta_1} & \frac{\partial c_2}{\partial \theta_2} \\ \vdots & \vdots & \vdots & \vdots \\ \frac{\partial c_8}{\partial \phi_1} & \frac{\partial c_8}{\partial \phi_2} & \frac{\partial c_8}{\partial \theta_1} & \frac{\partial c_8}{\partial \theta_2} \end{pmatrix} \tag{18}$$

The parameters $\theta$ are updated in accordance with the rule $$\theta(t_{n+1}) = \theta(t_n) - \gamma \sum_{l=2}^{Q} \sum_{p=1}^{l-1} \nabla H_{lp}(\theta)\bigg|_{\theta=\theta(t_n)} \tag{19}$$

or in accordance with the following simplified rule based only on the sign:

$$\theta(t_{n+1}) = \theta(t_n) \gamma \text{sign} \sum_{l=2}^{Q} \sum_{p=1}^{l-1} \nabla H_{lp}(\theta) \bigg|_{\theta=\theta(t_n)} \quad (20)$$

When the control parameters are different from those taken as examples we will naturally have different relationships between these control parameters and the coefficients $c_i$.

For example, if the PC is controlled by means of some voltages, given the relationship between these voltages and the coefficients $h_1$ and $h_2$ which appear in (2), by using the equations (17) we will be able to express the coefficients $c_i$ as a function of these new control parameters.

Consequently in computing the gradient of the function $H(\theta)$, the only change we have to allow for is the expression of the Jacobean matrix J, which has to be changed accordingly.

Lastly it is noted that when this second method is used the CD must receive the optical signals at the input and output of the compensator. The CD must supply the controller not only with the Stokes parameters for the optical signal at the compensator output and computed at the Q frequencies $f_l$, l=1, 2, ..., Q but also with the signals $x_{1,l}(t)$, $x_{2,l}(t)$, $y_{1,l}(t)$ e $y_{2,l}(t)$ corresponding to the Q frequencies $f_l$, l=1, 2, ..., Q.

It is now clear that the predetermined purposes have been achieved by making available an effective method for adaptive control of a PMD compensator and a compensator applying this method.

Naturally the above description of an embodiment applying the innovative principles of the present invention is given by way of non-limiting example of said principles within the scope of the exclusive right claimed here.

What is claimed is:

1. Method for the adaptive adjustment of a PMD compensator in optical fiber communication systems with the compensator comprising a cascade of adjustable optical devices over which passes an optical signal to be compensated comprising the steps of:
   computing the Stokes parameters $S_0$, $S_1$, $S_2$, $S_3$ in a number Q of different frequencies of the compensator output signal, and
   producing control signals for parameters of at least some of said adjustable optical devices so as to make virtually constant said Stokes parameters computed at different frequencies.

2. Method in accordance with claim 1 comprising the steps of computing the Stokes parameters in pairs of frequencies fl and fp with l,p=1, 2, ..., Q, obtaining at the lth and pth frequencies of the Q frequencies the two series of Stokes parameters $S_{0,l}$, $S_{1,l}$, $S_{2,l}$, $S_{3,l}$ and $S_{0,p}$, $S_{1,p}$, $S_{2,p}$, $S_{3,p}$, computing a vector function of each series of Stokes parameters and producing the control signals in such a manner that said vectors function of the two series of parameters are virtually parallel to each other.

3. Method in accordance with claim 2 in which said vectors are unitary norm vectors with components given by the Stokes parameters $S_1$, $S_2$, $S_3$ normalized to the Stokes parameter $S_0$, i.e.:

$$\left(\frac{S_{1,l}}{S_{0,l}}, \frac{S_{2,l}}{S_{0,l}}, \frac{S_{3,l}}{S_{0,l}}\right)^T$$

and $$\left(\frac{S_{1,p}}{S_{0,p}}, \frac{S_{2,p}}{S_{0,p}}, \frac{S_{3,p}}{S_{0,p}}\right)^T.$$

4. Method in accordance with claim 3 in which is defined the function:

$$G(\theta) \triangleq \sum_{l=2}^{Q} \sum_{p=1}^{l-1} G_{lp}(\theta)$$

with $G_{lp}(\theta) = \left(\frac{S_{1,l}}{S_{0,l}} - \frac{S_{1,p}}{S_{0,p}}\right)^2 + \left(\frac{S_{2,l}}{S_{0,l}} - \frac{S_{2,p}}{S_{0,p}}\right)^2 + \left(\frac{S_{3,l}}{S_{0,l}} - \frac{S_{3,p}}{S_{0,p}}\right)^2$ and the control signals are produced to minimize said function $G(\theta)$.

5. Method in accordance with claim 4 in which the optical devices comprise a polarization controller with controllable angles $\phi_1$, $\phi_2$ and two rotators with controllable rotation angles respectively $\theta_1$ and $\theta_2$, and to minimize the function $G(\theta)$ the updating of $\phi_1$, $\phi_2$, $\theta_1$ and $\theta_2$ of the compensator observes the following rules to go from the nth iteration to the n+1th iteration:

$$\phi_1(t_{n+1}) = \phi_1(t_n) - \gamma \frac{\partial G(\theta)}{\partial \phi_1}\bigg|_{\theta=\theta(t_n)}$$

$$= \phi_1(t_n) - \gamma \sum_{l=2}^{Q} \sum_{p=1}^{l-1} \frac{\partial G_{lp}(\theta)}{\partial \phi_1}\bigg|_{\theta=\theta(t_n)}$$

$$\phi_2(t_{n+1}) = \phi_2(t_n) - \gamma \frac{\partial G(\theta)}{\partial \phi_2}\bigg|_{\theta=\theta(t_n)}$$

$$= \phi_2(t_n) - \gamma \sum_{l=2}^{Q} \sum_{p=1}^{l-1} \frac{\partial G_{lp}(\theta)}{\partial \phi_2}\bigg|_{\theta=\theta(t_n)}$$

$$\theta_1(t_{n+1}) = \theta_1(t_n) - \gamma \frac{\partial G(\theta)}{\partial \theta_1}\bigg|_{\theta=\theta(t_n)}$$

$$= \theta_1(t_n) - \gamma \sum_{l=2}^{Q} \sum_{p=1}^{l-1} \frac{\partial G_{lp}(\theta)}{\partial \theta_1}\bigg|_{\theta=\theta(t_n)}$$

$$\theta_2(t_{n+1}) = \theta_2(t_n) - \gamma \frac{\partial G(\theta)}{\partial \theta_2}\bigg|_{\theta=\theta(t_n)}$$

$$= \theta_2(t_n) - \gamma \sum_{l=2}^{Q} \sum_{p=1}^{l-1} \frac{\partial G_{lp}(\theta)}{\partial \theta_2}\bigg|_{\theta=\theta(t_n)}.$$

6. Method in accordance with claim 5 in which the partial derivatives of $G(\theta)$ for $\theta=\theta(t_n)$ are computed in accordance with the following steps:
   Step 1. find the value of $G[\theta(t_n)]=G[\phi_1(t_n), \phi_2(t_n), \theta_1(t_n), \theta_2(t_n)]$ at iteration n; to do this, in the time interval $(t_n, t_n+T_u/5)$ the Stokes parameters at the Q frequencies are derived and the value of the function $G(\theta)$ is computed Step 2. find the partial derivative $$\left.\frac{\partial G(\theta)}{\partial \phi_1}\right|_{\theta=\theta(t_n)}$$

at iteration n; to do this, parameter $\phi_1$ is set at $\phi_1(t_n)+\Delta$ while the other parameters are left unchanged, the corresponding value of $G(\theta)$, i.e. $G[\phi_1(t_n)+\Delta, \phi_2(t_n), \theta_1(t_n), \theta_2(t_n)]$, is computed as in step 1 but in the time interval $(t_n+T_u/5, t_n+2T_u/5)$ and the estimate of the partial derivative of $G(\theta)$ with respect to $\phi_1$ is computed as:

$$\left.\frac{\partial G(\theta)}{\partial \phi_1}\right|_{\theta=\theta(t_n)} \cong \frac{G[\phi_1(t_n)+\Delta, \phi_2(t_n), \theta_1(t_n), \theta_2(t_n)] - G[\phi_1(t_n), \phi_2(t_n), \theta_1(t_n), \theta_2(t_n)]}{\Delta}$$

Step 3. Find the partial derivative:

$$\left.\frac{\partial G(\theta)}{\partial \phi_2}\right|_{\theta=\theta(t_n)}$$

at iteration n; to do this the parameter $\phi_2$ is set at $\phi_2(t_n)+\Delta$ while the other parameters are left changed, the corresponding value of $G(\theta)$, i.e. $G[\phi_1(t_n), \phi_2(t_n)+\Delta, \theta_1(t_n), \theta_2(t_n)]$, is computed as in step 1 but in the time interval $(t_n+2T_u/5, t_n+3T_u/5)$ and the estimate of the partial derivative of $G(\theta)$ with respect to $\phi_2$ is computed as:

$$\left.\frac{\partial G(\theta)}{\partial \phi_2}\right|_{\theta=\theta(t_n)} \cong \frac{G[\phi_1(t_n), \phi_2(t_n)+\Delta, \theta_1(t_n), \theta_2(t_n)] - G[\phi_1(t_n), \phi_2(t_n), \theta_1(t_n), \theta_2(t_n)]}{\Delta}$$

Step 4. Find the partial derivative:

$$\left.\frac{\partial G(\theta)}{\partial \theta_1}\right|_{\theta=\theta(t_n)}$$

at iteration n; to do this, parameter $\theta_1$ is set at $\theta_1(t_n)+\Delta$ while the other parameters are left unchanged, the corresponding value of $G(\theta)$, i.e. $G[\phi_1(t_n) \phi_2(t_n), \theta_1(t_n)+\Delta, \theta_2(t_n)]$, is computed as in Step 1 but in the time interval $(t_n+3T_u/5, t_n+4T_u/5)$ and the estimate of the partial derivative of $G(\theta)$ with respect to $\theta_1$ is computed as:

$$\left.\frac{\partial G(\theta)}{\partial \theta_1}\right|_{\theta=\theta(t_n)} \cong \frac{G[\phi_1(t_n), \phi_2(t_n), \theta_1(t_n)+\Delta, \theta_2(t_n)] - G[\phi_1(t_n), \phi_2(t_n), \theta_1(t_n), \theta_2(t_n)]}{\Delta}$$

Step 5. Find the partial derivative:

$$\left.\frac{\partial G(\theta)}{\partial \theta_2}\right|_{\theta=\theta(t_n)}$$

at iteration n; to do this the parameter $\phi_2$ is set at $\phi_2(t_n)+\Delta$ while the other parameters are left unchanged, the corresponding value of $G(\theta)$, i.e. $G[\phi_1(t_n), \phi_2(t_n), \theta_1(t_n), \theta_2(t_n)+\Delta]$, is computed as in step 1 but in the time interval $(t_n+4T_u/5, t_n+T_u)$ and the estimate of the partial derivative of $G(\theta)$ with respect to $\phi_2$ is computed as:

$$\left.\frac{\partial G(\theta)}{\partial \theta_2}\right|_{\theta=\theta(t_n)} \cong \frac{G[\phi_1(t_n), \phi_2(t_n), \theta_1(t_n), \theta_2(t_n)+\Delta] - G[\phi_1(t_n), \phi_2(t_n), \theta_1(t_n), \theta_2(t_n)]}{\Delta}.$$

7. Method in accordance with claim 1 comprising the steps of computing the Stokes parameters in pairs of frequencies $f_l$ and $f_p$ with l,p=1, 2, . . . , Q, to obtain at the lth and pth frequencies of the Q frequencies the two series of Stokes parameters $S_{1,l}$, $S_{2,l}$, $S_{3,l}$ e $S_{1,p}$, $S_{2,p}$, $S_{3,p}$, defining the function:

$$H(\theta) = \sum_{l=2}^{Q} \sum_{p=1}^{l-1} H_{lp}(\theta)$$

with $H_{lp}(\theta) = (S_{1,l} - S_{1,p})^2 + (S_{2,l} - S_{2,p})^2 + (S_{3,l} - S_{3,p})^2$ with and producing said control signals to minimize said function $H(\theta)$.

8. Method in accordance with claim 7 in which the optical devices comprise a polarization controller with controllable angles $\phi_1$, $\phi_2$ and two rotators with controllable rotation angles respectively $\theta_1$ and $\theta_2$, and for minimizing the function $H(\theta)$ the updating of $\phi_1$, $\phi_2$, $\theta_1$ and $\theta_2$, of the compensator follows the following mles for passing from the nth iteration to the n+1th e iteration:

$$\theta(t_{n+1}) = \theta(t_n) - \gamma \sum_{l=2}^{Q} \sum_{p=1}^{l-1} \nabla H_{lp}(\theta) \bigg|_{\theta=\theta(t_n)}$$

or the following simplified rule:

$$\theta(t_{n+1}) = \theta(t_n) - \gamma \text{sign}\left[\sum_{l=2}^{Q} \sum_{p=1}^{l-1} \nabla H_{lp}(\theta) \bigg|_{\theta=\theta(t_n)}\right]$$

with $\nabla H_{LP}(\theta)$ equal to the gradient of $H_{lp}(\theta)$ with respect to $\theta$.

9. Method in accordance with claim 7 in which said parameters are consolidated in a vector $\theta$ which is updated in accordance with the rule $$\theta(t_{n+1}) = \theta(t_n) - \gamma \sum_{l=2}^{Q} \sum_{p=1}^{l-1} \nabla H_{lp}(\theta)|_{\theta=\theta(t_n)} \quad (19)$$

or the following simplified rule based only on the sign:

$$\theta(t_{n+1}) = \theta(t_n) - \gamma \operatorname{sign}\left[\sum_{l=2}^{Q} \sum_{p=1}^{l-1} \nabla H_{lp}(\theta)|_{\theta=\theta(t_n)}\right] \quad (20)$$

with $\nabla H_{LP}(\theta)$ equal to the gradient of $H_{lp}(\theta)$ with respect to $\theta$.

10. Method in accordance with claim 9 in which between the controller and an optical rotator and between optical rotators there are fibers which introduce a predetermined differential unit delay maintaining the polarization.

11. Method in accordance with claim 1 in which the PMD compensator is modeled like a two-dimensional transversal filter with four tappered delay lines combining the signals on the two principal states of polarization (PSP).

12. Method in accordance with claim 11 in which the gradient $\nabla H_{LP}(\theta)$ with respect to $\theta$ is computed as:

$$\nabla H_{lp}(\theta) = 4(S_{1,l} - S_{1,p})\operatorname{Re}\left\{\frac{1}{T_u}\int_{t_n}^{t_{n+1}} [y_{1,l}^*(t)a_l^T(t) - y_{2,l}(t)b_l^T(t) -$$

$$y_{1,p}^*(t)a_p^T(t) + y_{2,p}^*(t)b_p^T(t)]dtJ\right\} +$$

$$4(S_{2,l} - S_{2,p})\operatorname{Re}\left\{\frac{1}{T_u}\int_{t_n}^{t_{n+1}} [y_{2,l}^*(t)a_l^T(t) + y_{1,l}(t)b_l^T(t) -$$

$$y_{2,p}^*(t)a_p^T(t) - y_{1,p}^*(t)b_j^T(t)]dtJ\right\} -$$

$$4(S_{3,l} - S_{3,p})\operatorname{Im}\left\{\frac{1}{T_u}\int_{t_n}^{t_{n+1}} [y_{2,l}^*(t)a_l^T(t) + y_{1,l}(t)b_l^T(t) -$$

$$y_{2,p}^*(t)a_p^T(t) - y_{1,p}^*(t)b_p^T(t)]dtJ\right\}$$

where $y_{1,l}(t)$, $y_{2,l}(t)$ and $y_{1,p}(t)$, $y_{2,p}(t)$ are respectively the components $y_1(t)$ e $y_2(t)$ on the two orthogonal polarizations of the compensator output signal filtered respectively through a narrow band filter centered on the frequency $f_l$ and $f_p$; and $a_l(t)$ e $b_l(t)$ are the vectors:

$$a_l(t) = \begin{pmatrix} x_{1,l}(t) \\ x_{1,l}(t - \alpha\tau_c) \\ x_{1,l}(t - \tau_c) \\ x_{1,l}(t - \tau_c - \alpha\tau_c) \\ x_{2,l}(t) \\ x_{2,l}(t - \alpha\tau_c) \\ x_{2,l}(t - \tau_c) \\ x_{2,l}(t - \tau_c - \alpha\tau_c) \end{pmatrix} \quad b_l(t) = \begin{pmatrix} x_{2,l}^*(t - 2\tau_c) \\ x_{2,l}^*(t - \tau_c - \beta\tau_c) \\ x_{2,l}^*(t - \tau_c) \\ x_{2,l}^*(t - \beta\tau_c) \\ -x_{1,l}^*(t - 2\tau_c) \\ -x_{1,l}^*(t - \tau_c - \beta\tau_c) \\ -x_{1,l}^*(t - \tau_c) \\ -x_{1,l}^*(t - \beta\tau_c) \end{pmatrix}$$

with $x_{1,l}(t)$ and $x_{2,l}(t)$ which are respectively signals $x_1(t)$ and $x_2(t)$ on the two orthogonal polarizations of the compensator input signal filtered with a narrow band filter centered on the frequency $f_l$ (similarly $a_l(t)$ and $b_l(t)$ for $y_{1,p}(t)$ and $y_{2,p}(t)$) with the frequency $f_l$), and J is the Jacobean matrix of the transformation $c=c(\theta)$ defined as $$J \triangleq \begin{pmatrix} \frac{\partial c_1}{\partial \phi_1} & \frac{\partial c_1}{\partial \phi_2} & \frac{\partial c_1}{\partial \theta_1} & \frac{\partial c_1}{\partial \theta_2} \\ \frac{\partial c_2}{\partial \phi_1} & \frac{\partial c_2}{\partial \phi_2} & \frac{\partial c_2}{\partial \theta_1} & \frac{\partial c_2}{\partial \theta_2} \\ \vdots & \vdots & \vdots & \vdots \\ \frac{\partial c_8}{\partial \phi_1} & \frac{\partial c_8}{\partial \phi_2} & \frac{\partial c_8}{\partial \theta_1} & \frac{\partial c_8}{\partial \theta_2} \end{pmatrix} \quad (18)$$

with $c_1, \ldots, c_8$ which are the tap coefficients of the four tappered delay lines.

13. Method in accordance with claim 1 in which said optical devices comprise a polarization controller with control angles $\phi1$, $\phi2$ and two optical rotators with rotation angles $\theta1$ and $\theta2$ and said parameters comprise said control angles $\phi1$, $\phi2$ and said rotation angles $\theta1$ and $\theta2$.

14. PMD compensator in optical fiber communication systems comprising: a cascade of adjustable optical devices over which passes an optical signal to be compensated, and an adjustment system configured to take components y1(t) and y2(t) on the two orthogonal polarizations from the compensator output signal signal, the adjustment system comprising a controller which is operable to compute, on the basis of said components taken, the Stokes parameters $S_0$, $S_1$, $S_2$, $S_3$ in a number Q of different frequencies of the compensator output signal and to emit control signals for parameters of at least some of said adjustable optical devices so as to make virtually constant the Stokes parameters computed at the different frequencies.

15. Compensator in accordance with claim 14 characterized in that said optical devices comprise a polarization controller with control angles $\phi1$, $\phi2$ and two optical rotators with rotation angles $\theta_1$ and $\theta_2$ and in which said parameters for which the controller is operable to emit the control sianals consist of said control angles $\theta1$, $\theta2$ and said rotation angles $\theta_1$ and $\theta_2$.

16. Compensator in accordance with claim 15 characterized in that between the controller and an optical rotator and between optical rotators there are fibers which introduce a predetermined differential unit delay maintaining the polarization.

* * * * *

UNITED STATES PATENT AND TRADEMARK OFFICE
CERTIFICATE OF CORRECTION

PATENT NO. : 7,359,582 B2
APPLICATION NO. : 10/498613
DATED : April 15, 2008
INVENTOR(S) : Colavolpe et al.

It is certified that error appears in the above-identified patent and that said Letters Patent is hereby corrected as shown below:

In Column 6, Line 12, after "interval" delete "$(t_n 2T_u/5,$" and insert -- $(t_n + 2T_u/5,$ --, therefor.

In Column 11, Lines 41-43, in Claim 6, delete " $\left.\frac{\partial G(\theta)}{\partial \phi_2}\right|_{\theta=\theta(t_n)}$ " and insert -- $\left.\frac{\partial G(\theta)}{\partial \phi_2}\right|_{\theta=\theta(t_n)}$ --, therefor.

In Column 11, Line 55, in Claim 6, after "i.e." delete "$G[\Phi_1(t_n)]$" and insert -- $G[\Phi_1(t_n)],$ --, therefor.

In Column 11, Lines 63-65, in Claim 6, delete " $\left.\frac{\partial G(\theta)}{\partial \theta_1}\right|_{\theta=\theta(t_n)}$ " and insert -- $\left.\frac{\partial G(\theta)}{\partial \theta_1}\right|_{\theta=\theta(t_n)}$ --, therefor.

In Column 12, Lines 18-20, in Claim 6, delete " $\left.\frac{\partial G(\theta)}{\partial \theta_2}\right|_{\theta=\theta(t_n)}$ " and insert -- $\left.\frac{\partial G(\theta)}{\partial \theta_2}\right|_{\theta=\theta(t_n)}$ --, therefor.

In Column 12, Line 46, in Claim 8, delete "mles" and insert -- rules --, therefor.

In Column 12, Line 47, in Claim 8, after "n+1th" delete "e".

UNITED STATES PATENT AND TRADEMARK OFFICE
CERTIFICATE OF CORRECTION

PATENT NO.         : 7,359,582 B2
APPLICATION NO. : 10/498613
DATED              : April 15, 2008
INVENTOR(S)        : Colavolpe et al.

It is certified that error appears in the above-identified patent and that said Letters Patent is hereby corrected as shown below:

In Column 14, Line 35, in Claim 14, after "output" delete "signal".

In Column 14, Line 50, in Claim 15, delete "sianals" and insert -- signals --, therefor.

In Column 14, Line 50, in Claim 15, delete "$\theta1, \theta2$" and insert -- $\Phi1, \Phi2$ --, therefor.

Signed and Sealed this

Twenty-eighth Day of April, 2009

JOHN DOLL
*Acting Director of the United States Patent and Trademark Office*